US006526204B1

(12) United States Patent
Sherrer et al.

(10) Patent No.: US 6,526,204 B1
(45) Date of Patent: Feb. 25, 2003

(54) OPTICAL FIBER ARRAY FOR PREVENTING FLOW OF GLUE BETWEEN FIBERS AND WAVEGUIDE

(75) Inventors: David W Sherrer, Blacksburg, VA (US); Dan A Steinberg, Blacksburg, VA (US); Mindaugas F Dautartas, Blacksburg, VA (US)

(73) Assignee: Shipley Company LLC, Marlborough, MA (US)

( * ) Notice: Subject to any disclaimer, the term of this patent is extended or adjusted under 35 U.S.C. 154(b) by 0 days.

(21) Appl. No.: 09/713,117

(22) Filed: Nov. 15, 2000

Related U.S. Application Data

(60) Provisional application No. 60/217,259, filed on Jul. 11, 2000.

(51) Int. Cl.$^7$ ................................................. G02B 6/36
(52) U.S. Cl. .............................. 385/49; 385/88; 385/89; 385/80
(58) Field of Search ............................... 385/88, 89, 49, 385/14, 80, 155, 59, 60, 71, 72, 115–116

(56) References Cited

U.S. PATENT DOCUMENTS

| 5,446,815 | A | | 8/1995 | Ota et al. |
| 5,481,632 | A | | 1/1996 | Hirai et al. |
| 5,513,290 | A | | 4/1996 | Ishikawa et al. |
| 5,793,914 | A | * | 8/1998 | Sasaki ......................... 385/137 |
| 6,017,681 | A | * | 1/2000 | Tsukamoto et al. .......... 228/165 |
| 6,215,946 | B1 | * | 4/2001 | Sherrer ........................ 430/321 |

* cited by examiner

*Primary Examiner*—Robert H. Kim
*Assistant Examiner*—Richard Kim
(74) *Attorney, Agent, or Firm*—Brown, Rudnick, Berlack, Israels LLP

(57) ABSTRACT

An optical fiber array having wick stop grooves in a front face of the array. The wick stop grooves control the movement of liquid adhesive (e.g. UV curable adhesive, solder, sol-gel). Particularly, the wick stop grooves prevent liquid adhesive from flowing between the optical fibers in the array and waveguides of an integrated optic chip. Adhesives disposed in the fiber-waveguide optical path can degrade the performance of optical devices. The wick stop grooves can be cut with a dicing saw, or chemically etched (wet or dry), and can have a wide variety of patterns (e.g., straight lines, circles). In any case, the wick stop grooves must prevent the flow of liquid adhesive between the fibers and waveguides. Alternatively, the wick stop grooves are disposed in an edge of the integrated optic chip. Also, the wick stop grooves can be disposed on the front face of other microoptical devices such as filters and lenslet arrays.

34 Claims, 10 Drawing Sheets

OPTICAL FIBER ARRAY FOR PREVENTING FLOW OF GLUE BETWEEN FIBERS AND WAVEGUIDE

RELATED APPLICATIONS

The present application claims the benefit of priority of copending provisional patent application No. 60/217,259 filed on Jul. 11, 2000, which is hereby incorporated by reference.

FIELD OF THE INVENTION

The present invention relates generally to optical fiber arrays. More particularly, the present invention relates to an optical fiber array having grooves in a front face of the array. The grooves control the flow of glue when the array is glued to an integrated optic (IO) chip so that glue is not present in the optical path between the optical fiber and IO waveguide.

BACKGROUND OF THE INVENTION

Integrated optic (IO) devices are used for optical routing, switching, and modulating of optical signals. Integrated optic devices have an optical waveguide disposed on a chip. In order for an IO device to be useful, light from other waveguides (e.g. optical fibers) must be coupled into and out of the IO waveguides. Optical fibers are often coupled to an IO device by mounting several fibers in an array, and then gluing the array to terminal ends of the IO waveguides at an edge of the IO device. Many fibers can be simultaneously aligned in this manner.

FIG. 1 shows a side view of a typical combination of IO device and fiber array according to the prior art. The fiber array and IO chip are glued together (e.g. using UW-curable epoxy) so that the optical fibers are aligned with the waveguides. The IO chip has a mounting block so that the entire front face surface of the fiber array is glued to the IO chip.

The device of FIG. 1 is made by carefully aligning the fiber array and IO chip (so that IO waveguides and fibers are coupled), and then applying the glue. The glue is liquid and so flows into the narrow space between the fiber array and IO chip by capillary action. The glue is then cured by UV exposure or heat.

A problem with the device of FIG. 1 is that the glue flows between the optical fibers and the waveguides. A thin layer (e.g. 0.5–5 microns thick) of glue therefore lies in the fiber-waveguide optical path. This is undesirable in high-performance devices because the glue can interfere with (e.g. absorb or scatter) light signals. Also, the glue used should (1) have stable optical properties, (2) be index-matched to the waveguides/fibers, and (3) be optically clear. Such optical properties may not be compatible with other desirable glue properties such as high strength, low shrinkage, low creep and humidity tolerance.

U.S. Pat. No. 5,481,632 to Hiradi et al. teaches a structure for connecting fiber arrays and integrated optic waveguides. The fibers are recessed so that they do not rub against the IO chip during alignment. This prevents the fiber endfaces from becoming damaged.

U.S. Pat. No. 5,513,290 to Ishikawa et al. teaches a structure for connecting fiber arrays and integrated optic waveguides. A portion of the fiber array is made of a material that is UV-transparent. This allows UV light to access UV-curable adhesive between the IO chip and fiber array.

U.S. Pat. No. 5,446,815 to Ota et al. teaches an optical collimator array having an optical fiber array and collimating lenses. The collimating lenses have a recessed portion so that the lenses are spaced apart from the optical fibers.

Therefore, it would be an advance in the art to provide an optical fiber array-IO chip coupling arrangement that prevents glue from flowing into the optical path between the optical fibers and waveguides. Such an arrangement would enable a wide variety of adhesives to be used, and would enhance the operation of high-performance optical devices.

OBJECTS AND ADVANTAGES OF THE INVENTION

Accordingly, it is a primary object of the present invention to provide an optical fiber array-IO chip coupling arrangement that:

1) prevents the flow of adhesive into the optical path; and
2) is compatible with a wide variety of adhesives, including opaque solders and glues, and adhesives having very poor optical properties (e.g. low transmissivity, high birefringence, high scattering, uncontrolled refractive index).

These and other objects and advantages will be apparent upon reading the following description and accompanying drawings.

SUMMARY OF THE INVENTION

These objects and advantages are attained by an optical fiber array having a fiber array chip and an optical fiber attached to the chip. The chip has a front face with a wick stop groove that separates a bonding area and a nonbonding area. The optical fiber has an endface coplanar with the front face, and the fiber endface is disposed in the nonbonding area.

In operation, the front face is pressed against an integrated optic (IO) chip (or other optical device) and liquid adhesive is applied to the bonding area. The capillary flow of the liquid adhesive is blocked by the wick stop groove so that the adhesive does not flow between the optical fiber and a waveguide on the IO chip.

Preferably, the invention includes an IO chip bonded to the bonding area of the fiber array chip.

Also preferably, the fiber array chip comprises single crystal silicon with an anisotropically etched V-groove. The optical fiber is disposed in the V-groove.

The wick stop groove can be a dicing saw cut groove. The wick stop groove can have a width in the range of about 25–500 microns, and a depth in the range of about 5–500 microns. The best size and shape of the wick stop groove depend upon the wetting characteristics of the array chip material and adhesive used.

The wick stop groove can also be formed by bonding a stepped block to the fiber array. A step in a front face of the block provides the wick stop groove.

The fiber array can also have several intersecting wick stop grooves. The wick stop grooves may surround the fiber.

Also, the wick stop groove can be formed by a trench for holding the fiber (e.g. an anisotropically etched V-groove in silicon) having a widened front portion.

Also, the wick stop groove can be located on an IO chip. An IO chip with a wick stop groove can have any of the features described for fiber arrays with a wick stop groove.

Also, the present invention applies generally to any optical apparatus having two bonded optical devices where one device has a wick stop groove, a bonding area, and a nonbonding area. An optical path extends between the optical devices and through the nonbonding area. The wick stop groove prevents the flow of adhesive into the optical path. The optical devices can include fiber arrays, lens arrays, filters, light sources, modulators, sensors and the like.

Also, the present invention includes an embodiment where the bonding area is recessed compared to the nonbonding area. This provides a volume of controlled thickness for adhesive even when the nonbonding areas are in direct contact.

DETAILED DESCRIPTION

The present invention provides an optical fiber array for coupling to integrated optic (IO) chips and other devices where adhesive is not desired in the optical path. The optical fiber array of the present invention has a front face with a groove cut across the front face. When the fiber array is bonded to an IO chip, the groove provides an area that does not contact the IO chip. The groove therefore blocks capillary wicking of liquid adhesive. The grooves are located around the optical fiber ends so that glue does not flow over the endfaces of the optical fibers.

Figure 1:
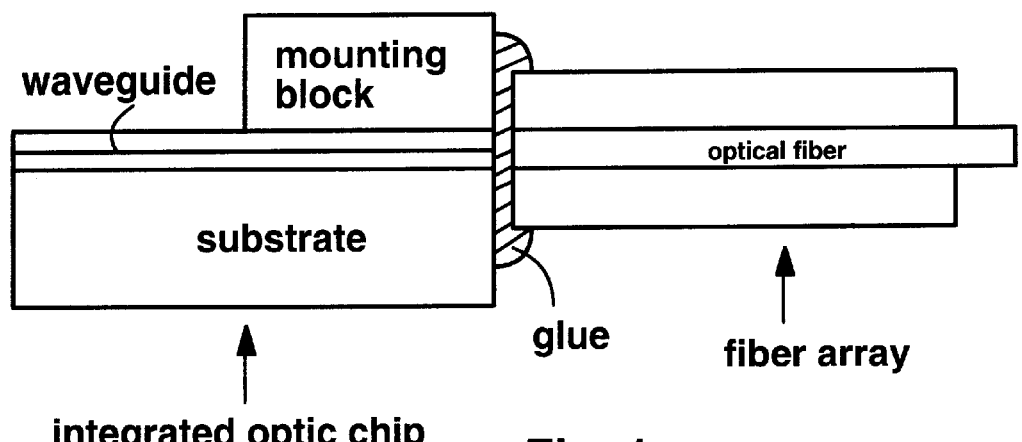
FIG. 1 (Prior Art) shows a side view of an integrated optic (IO) chip and fiber array combination as known in the art.
Figure 2:
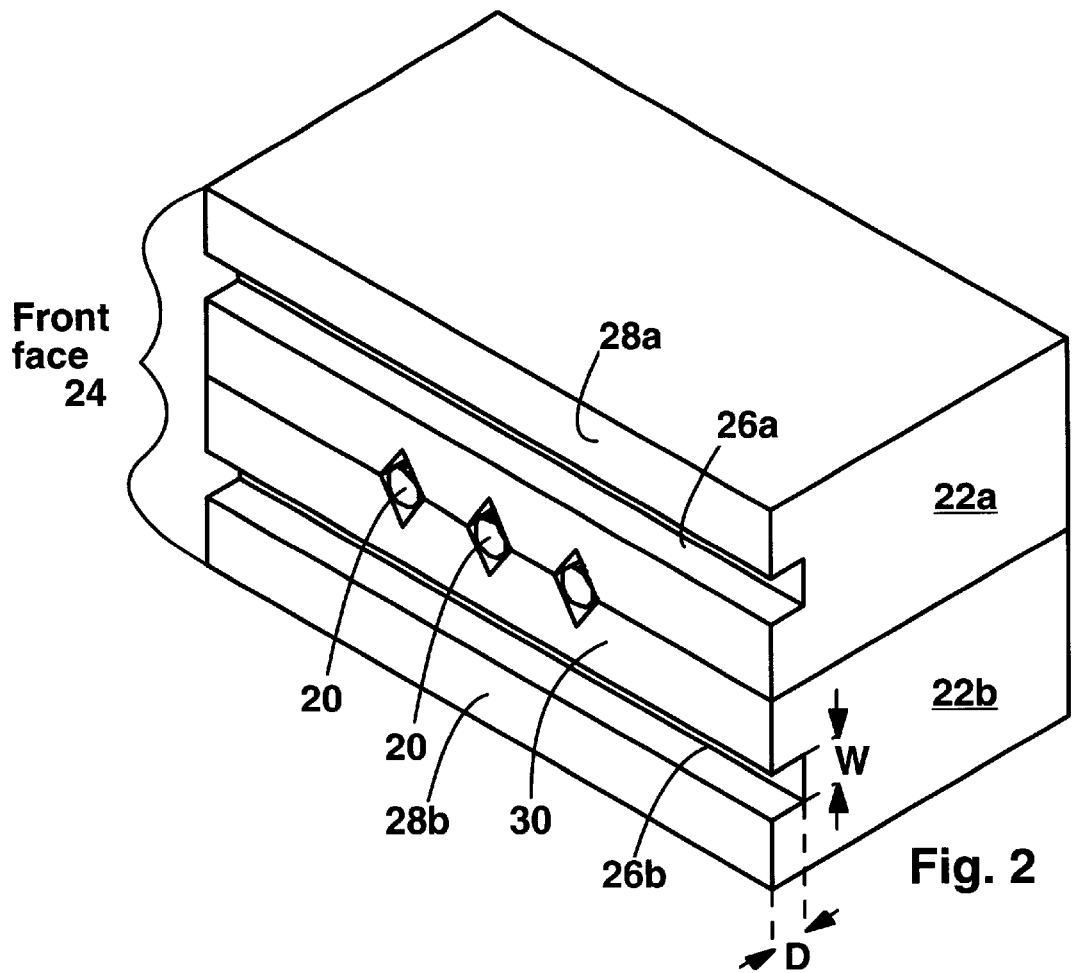
FIG. 2 shows a perspective view of an optical fiber array according to the present invention. Grooves are present in the front face of the array.

FIG. 2 shows a perspective view of an optical fiber array according to a preferred embodiment of the present invention. The optical fiber array has optical fibers 20 disposed between two V-groove chips 22a, 22b. The V-groove chips can be adhered together by Al—O bonding (aluminum thermocompression bonding), epoxy, sol-gel glass or solder, for example. The fiber array has a front face 24 which is flush with endfaces of the optical fibers 20.

The front face 24 has a first groove 26a and a second groove 26b. The grooves 26a 26b can be made by a dicing saw and can have any cross-sectional shape (e.g. a rectangular shape as shown, or a V-shape or U-shape). Preferably, the grooves have a width W of about 25–500 microns and a depth D of about 50–500 microns. The grooves can be wider and deeper than 500 microns, however.

The grooves 26 divide the front face into 3 areas: a top bonding area 28a, a bottom bonding area 28b, and a nonbonding area 30. Preferably, the bonding areas 28, and the nonbonding area 30 are coplanar and polished. In fact, the 3 areas 28a, 28b, 30 are preferably polished in the same polishing step. The optical fiber ends are preferably polished and coplanar with the nonbonding area 30.

Figure 3:
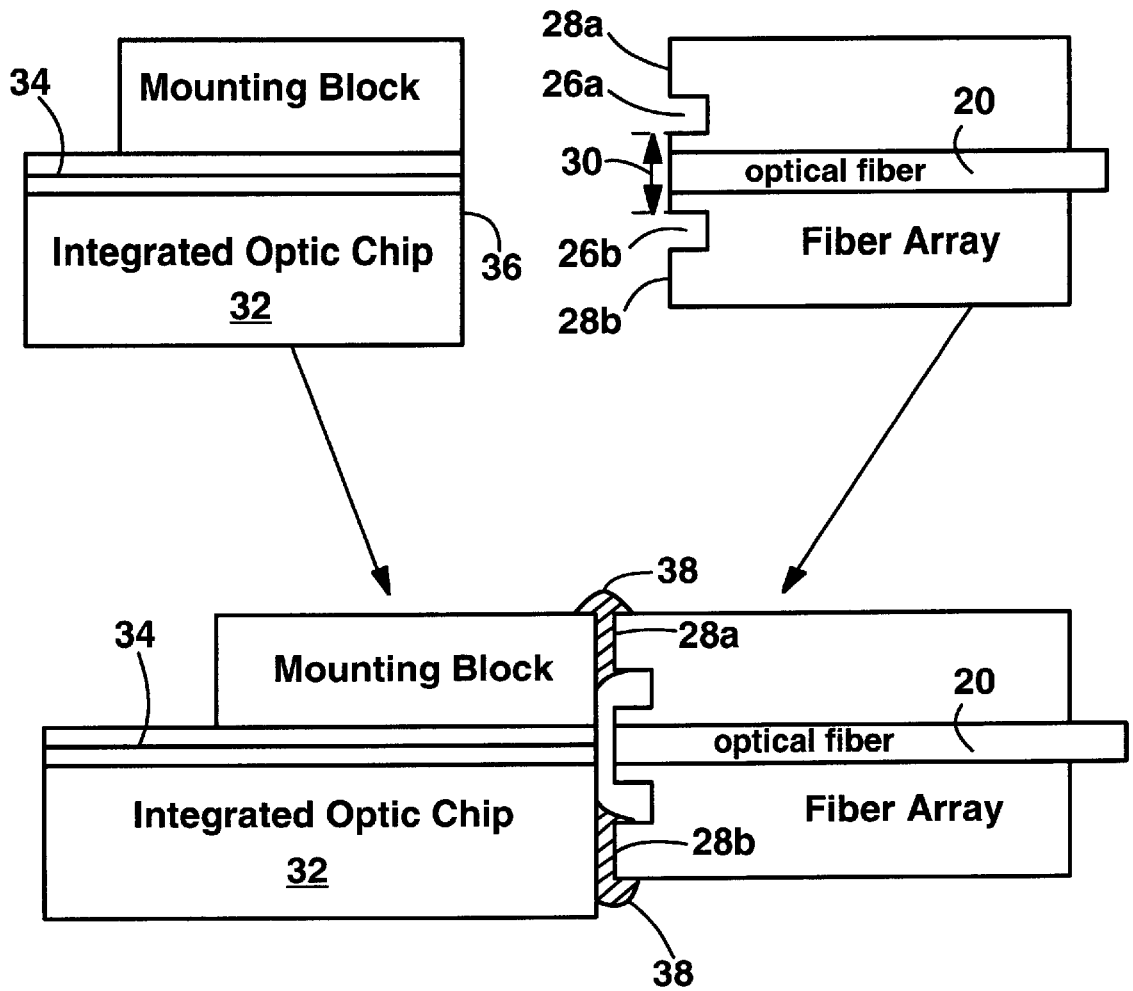
FIG. 3 illustrates how the fiber array of the present invention is bonded to an IO chip.

FIG. 3 shows a side view of the present fiber array and an integrated optic (IO) chip 32. The IO chip has waveguides 34 which terminate at an edge 36 of the IO chip. The present fiber array and the IO chip 32 are joined by contacting the fiber array front face and the edge 36 of the IO chip so that the optical fibers and the waveguides are aligned, as known in the art. Then, liquid adhesive 38 (e.g. UV curable epoxy, solder or sol-gel glass) is applied to edges of the bonding areas 28a, 28b. The liquid adhesive flows by capillary action into the narrow space between the bonding areas 28a, 28b and the IO edge 36. The flow of the adhesive is stopped by the grooves 26a, 26b so that adhesive does not flow into the area between the nonbonding area 30 and the IO edge 36. Therefore, adhesive is not present between the optical fibers 20 and the waveguides 34. The grooves 26a, 26b function as wick-stops.

Since the adhesive does not flow between the optical fibers 20 and the waveguides 34, the optical properties of the adhesive are immaterial to the device operation. Many different glues, adhesives, solders, sol-gels and other materials with very poor optical properties can be used to bond the fiber array and IO chip.

The adhesive 38 can comprise metal solder if the bonding areas 28a, 28b and corresponding areas of the IO edge 36 are metalized. In this case, the array and IO chip must be heated so that solder will flow between the array and IO chip.

The fiber array and IO chip are separated by a thin gap (e.g. typically in the range of about 0.2–10 microns).

Figure 4:
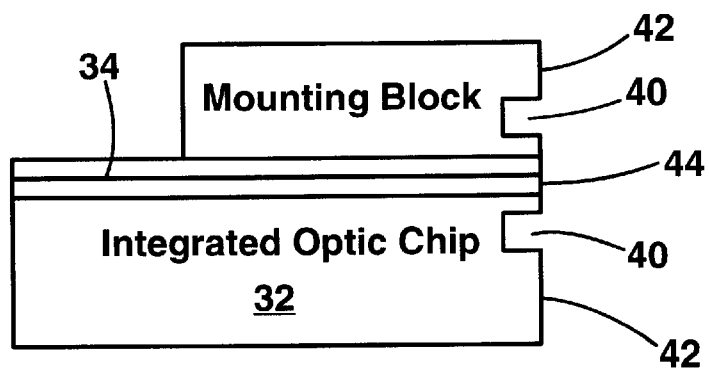
FIG. 4 shows an IO chip according to the present invention. The IO chip has wick stop grooves for controlling the flow of adhesive.

FIG. 4 shows another embodiment of the present invention where the IO chip, instead of the fiber array, has wick stop grooves 40. The IO chip has an optional mounting block, bonding areas 42, and a nonbonding area 44. The waveguide 34 necessarily terminates in the nonbonding area 44. The bonding area 42 and nonbonding area are separated by the wick stop grooves 40. The wick stop grooves 40 in the IO chip can be essentially the same as the wick stop grooves 26a, 26b in the fiber array; the wick stop grooves 40 can be about 25–500 microns wide and 50–500 microns deep and can be made by a dicing saw or chemical etching, for example.

Figure 5:
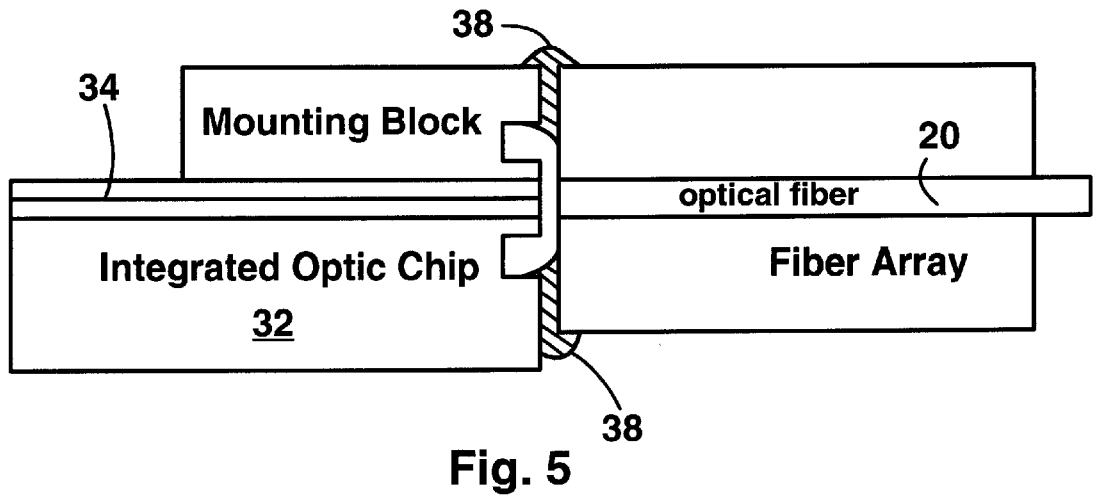
FIG. 5 shows the IO chip with wick stop grooves bonded to a fiber array.

FIG. 5 shows the IO chip with wick stop grooves bonded to a fiber array which does not have wick stop grooves.

Figure 6:
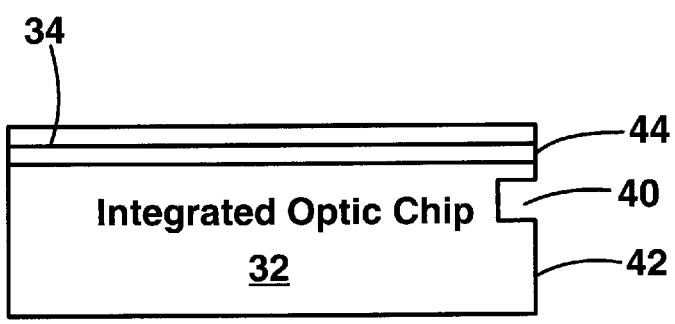
FIG. 6 shows an IO chip having a single wick stop groove and no mounting block.

FIG. 6 shows an embodiment of the IO chip where the mounting block is not present. The nonbonding area 44 is located at a top part of the IO chip; the bonding area is located at a bottom part of the chip. Preferably in this embodiment, the bonding area is 5–10 times larger than the nonbonding area.

Figure 7:
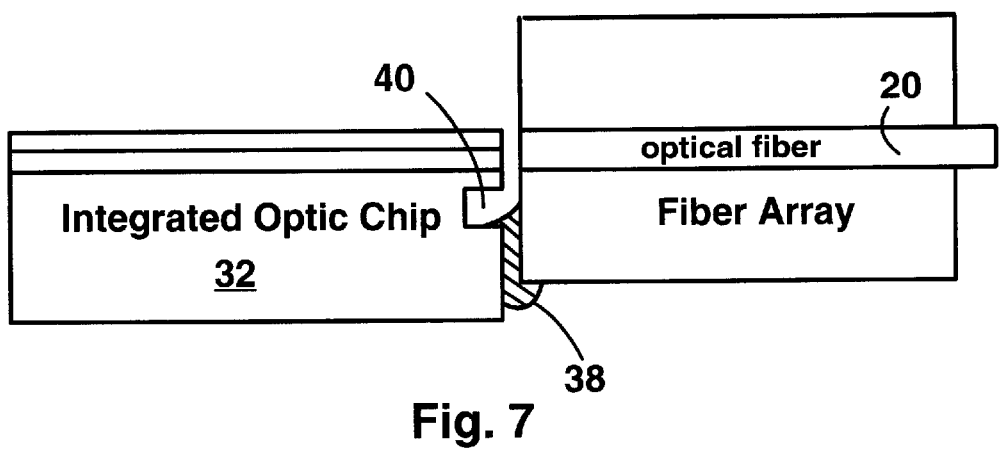
FIG. 7 shows a fiber array bonded to the IO chip having a single wick stop groove.

FIG. 7 shows the IO chip without the mounting block bonded to a fiber array. The wick stop groove 40 prevents adhesive 38 from flowing between the optical fiber and waveguide 34, as in the previous embodiments.

Figure 8:
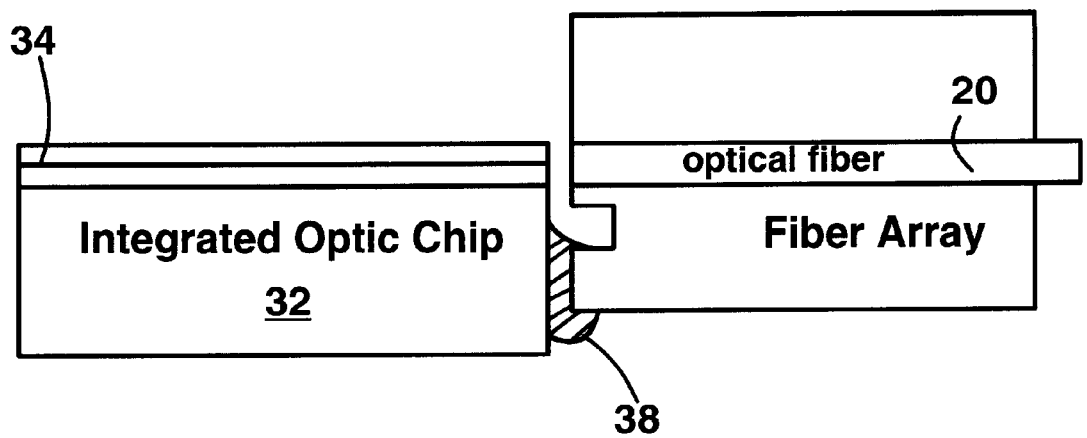
FIG. 8 shows the IO chip bonded to the fiber array having a single wick stop groove.

FIG. 8 shows an alternative embodiment where the fiber array has a single wick stop groove.

It is also noted that both the IO chip and fiber array can have wick stop grooves. In this case, it is preferable for the wick stop grooves in the IO chip and fiber array to be aligned.

Figure 9:
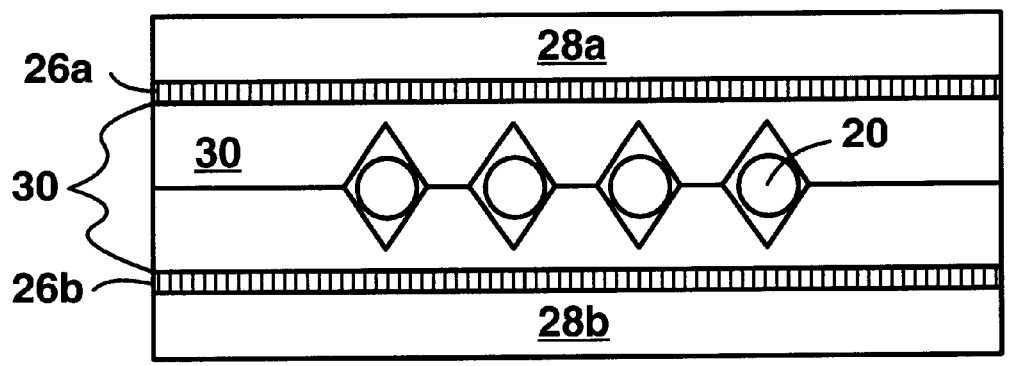
FIG. 9 shows a front view of the fiber array having horizontal wick stop grooves.

FIG. 9 shows a front view of the present fiber array. The wick stop grooves 26a 26b, separate the bonding areas 28a 28b from the nonbonding area 30. The optical fiber endfaces are located in the nonbonding area 30. The nonbonding area 30 preferably includes the entire area between the wick stop grooves 26a 26b.

Figure 10:
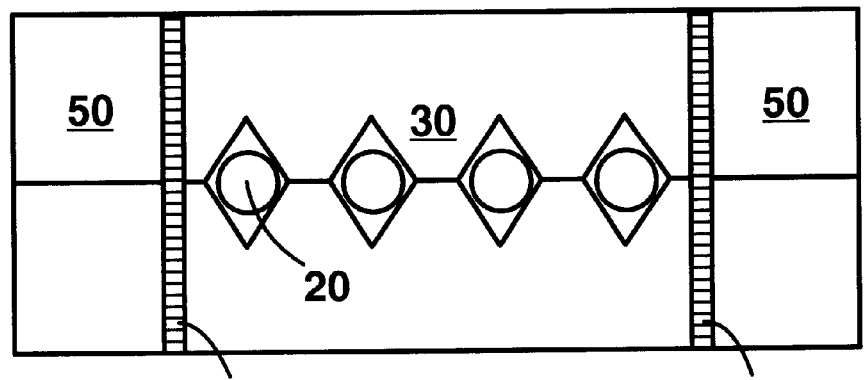
FIG. 10 shows a front view of the fiber array having vertical wick stop grooves.

FIG. 10 shows a front view of an alternative embodiment of the fiber array having vertical wick stop grooves 48. Bonding areas 50 are located on the sides of the fiber array; the nonbonding area 30 is located in the middle of the chip and surrounds the optical fibers 20. The nonbonding area 30 preferably includes the entire area between the wick stop grooves 48.

Figure 11:
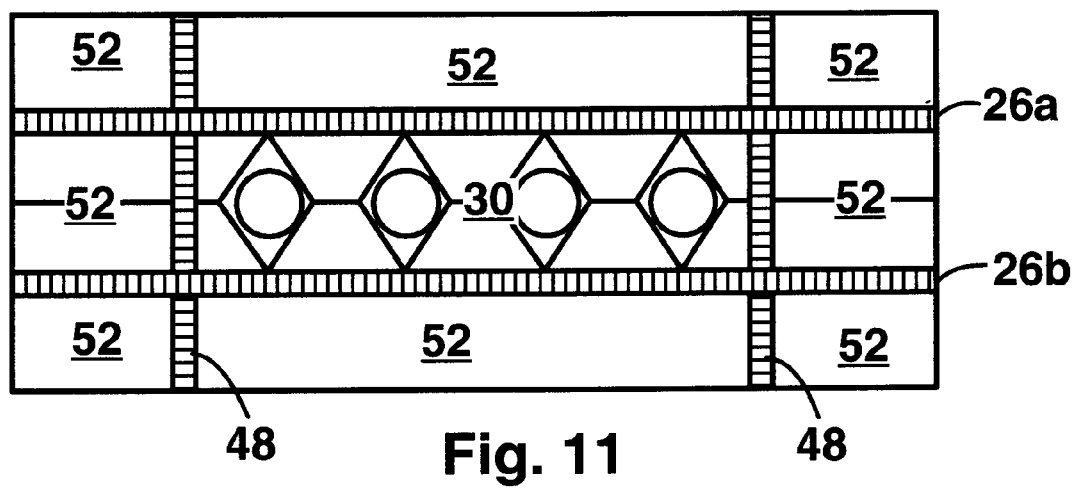
FIG. 11 shows a front view of the fiber array having both vertical and horizontal wick stop grooves.

FIG. 11 shows a front view of the fiber array having both vertical wick stop grooves 48 and horizontal wick stop grooves 26a 26b. The wick stop grooves 26a 26b 48 define the nonbonding area 30 and bonding areas 52.

Figure 12:
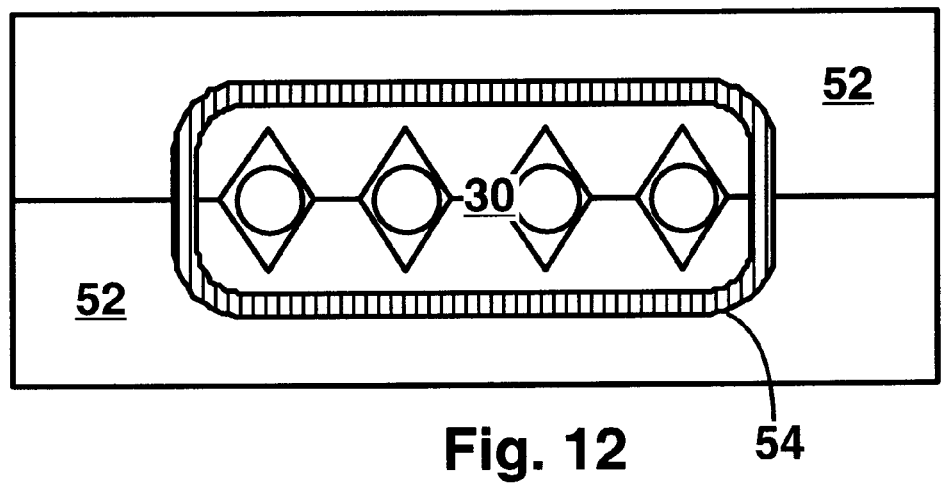
FIG. 12 shows a front view of the fiber array having a single wick stop groove that circumscribes the optical fibers.

FIG. 12 shows yet another embodiment where the wick stop groove 54 surrounds the optical fibers 20 and nonbonding area 30. The wick stop groove 54 can be made by chemical etching, sandblasting or sawing. The bonding area 52 comprises most of the surface area of the front face.

Figure 13:
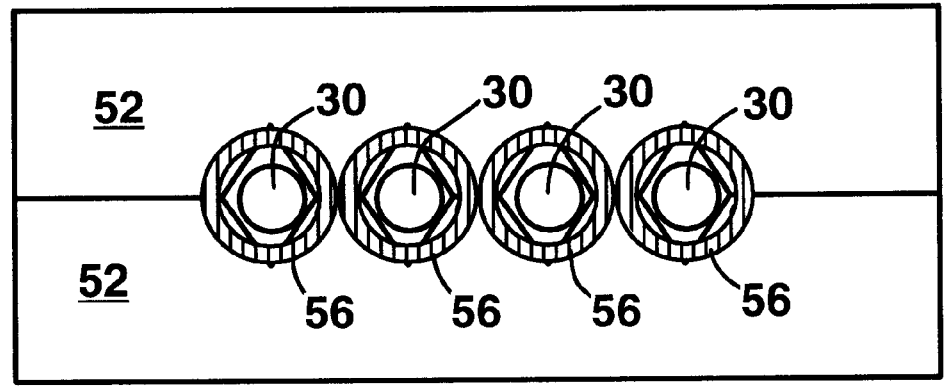
FIG. 13 shows a front view of the fiber array having circular wick stop grooves surrounding each optical fiber.

FIG. 13 shows yet another embodiment where a circular wick stop groove 56 surrounds each optical fiber endface. Four separate nonbonding areas 30 surround each of the optical fibers. The bonding area 52 comprises most of the surface area of the front face.

Figure 14:
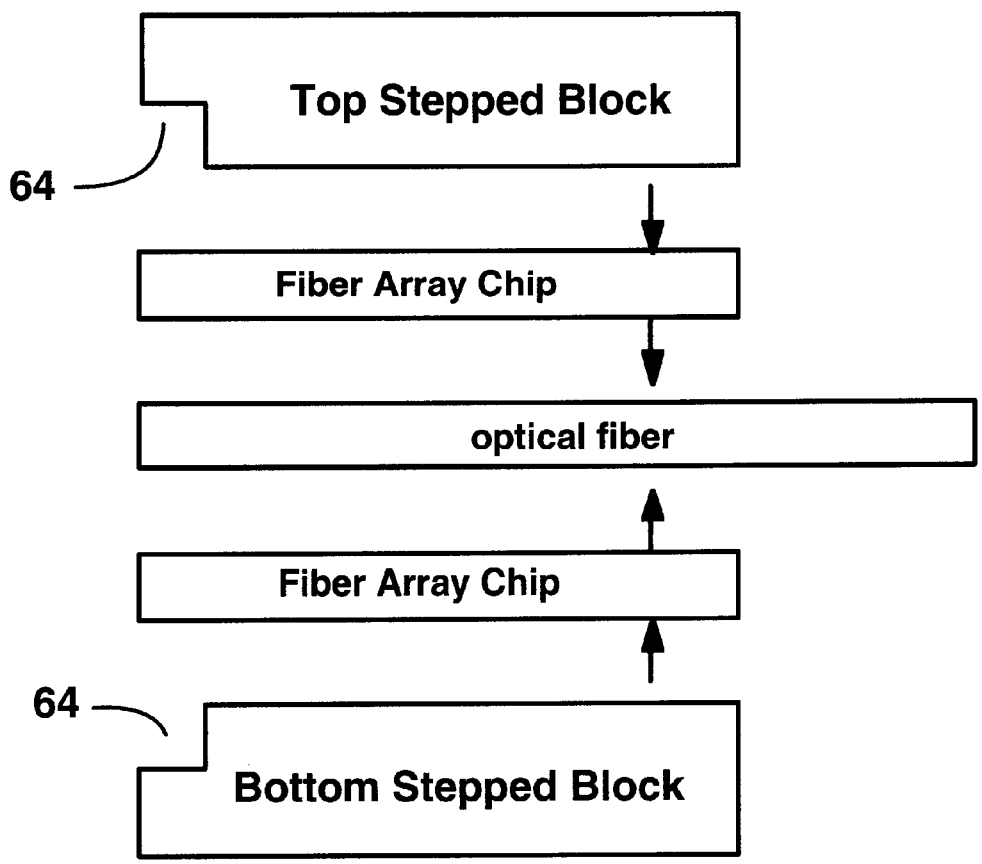
FIG. 14 illustrates an alternative method for making the fiber array. In this method stepped blocks are bonded to the top and bottom of the fiber array.
Figure 15:
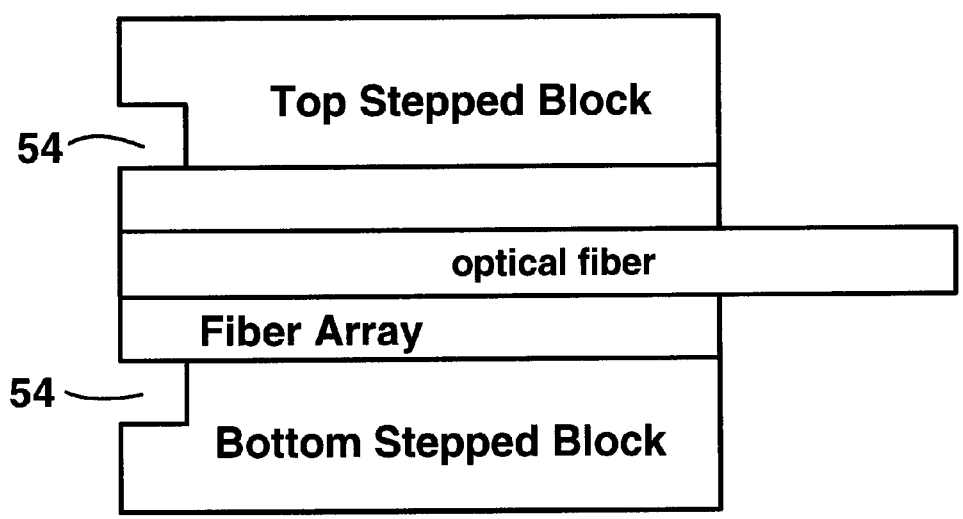
FIG. 15 shows a side view of the fiber array made according to the method of FIG. 14.

FIG. 14 shows a side view of an alternative method for making the present fiber array. A top stepped block 60 and a bottom stepped block 62 each have steps 64. The front face of the fiber array is preferably planar with not wick stop grooves. When the blocks 60 62 are bonded to the fiber array, the steps 64 produce wick stop grooves 54 in the front face of the fiber array. A completed fiber array is shown ion FIG. 15. In a preferred embodiment, the blocks 60 62 are bonded (e.g., using adhesives, sol gels, solder, or direct bonding) to the fiber array chips while still attached in wafer form (i.e., before optical fibers are attached to the array chips). Then, the bonded wafers are diced into chips and fibers are attached. This method allows the array to be batch processed. The steps 64 can be formed with a dicing saw or chemical etching. Wick stop grooves formed by stepped blocks are necessarily horizontal or vertical (vertical wick stop grooves can be formed by bonding stepped blocks to the sides of the fiber array).

It is noted that the embodiments of FIGS. 10, 11, 12, 13, 14, and 15 apply equally to IO chips. For example, the IO chip 32 can have vertical wick stop grooves or both horizontal and vertical wick stop grooves. Also, the IO chip can have circular wick stop grooves, or a single wick stop groove that circumscribes the waveguides 34. Also, wick stop grooves in the IO chip can be formed by bonding stepped blocks to the top or bottom of the IO chip 32.

It is also noted that the present invention can be used in bonding two integrated optic chips together, or in bonding two fiber arrays together.

Figure 16:
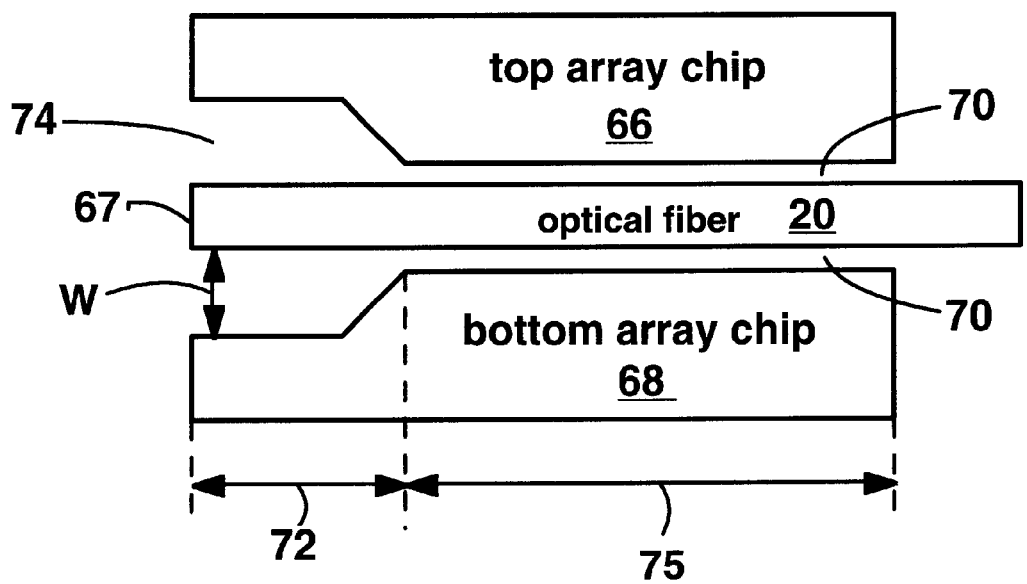
FIG. 16 shows the fiber array where the wick stop grooves are formed by a wide trench for holding the optical fibers.

FIG. 16 shows a cross sectional side view of yet another embodiment of a fiber array according to the present invention where the nonbonding area consists of only the optical fiber endface 67. Here, a top chip 66 and a bottom chip 68 in the fiber array have trenches 70 (e.g. V-grooves) that hold the optical fiber. A length 72 of the trenches is widened at a front portion 72 of the array. A rear portion 75 of the array has trenches that are sized to securely hold the optical fiber. The optical fiber is bonded to the chips 66 68 in the rear portion 75; the optical fiber is freestanding in the front portion 72.

The widened trenches in the front portion 72 provide a wick stop groove 74 that surrounds each optical fiber 20. The wick stop groove 74 has a width W that is determined by the size and shape of the trenches. Preferably, the width W of the wick stop groove provided by the trenches is in the range of about 25–500 microns. Preferably, the front portion 72 of the widened trenches is about 50–500 microns long. Also preferably, the length of the front portion 72 of the widened trenches should be less than 6 times the diameter of the optical fiber (more preferably less than 4 times the diameter of the optical fiber). This is because the optical fiber is unsupported in the front portion 72, and can therefore bend if the front portion 72 is too long.

Figure 17:
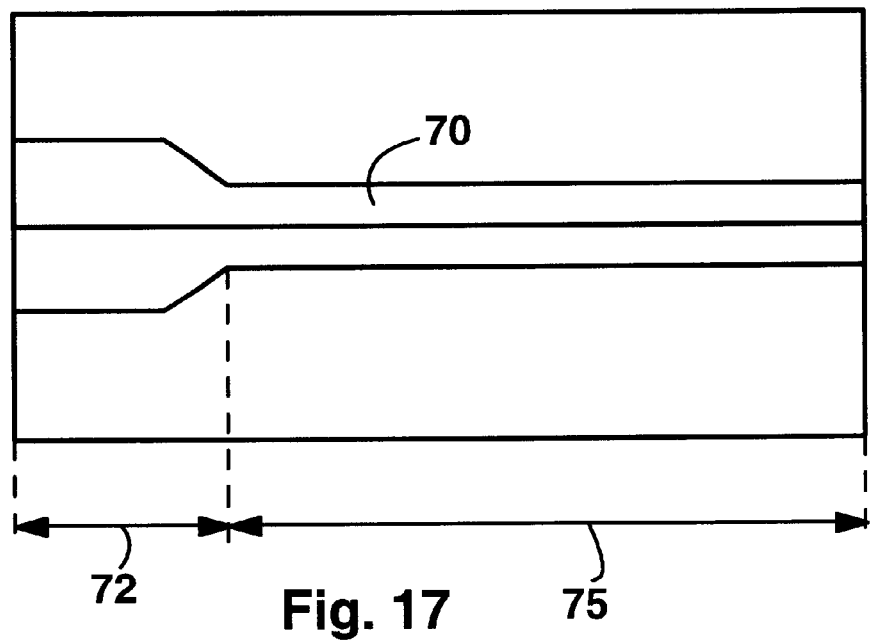
FIG. 17 shows a top view of a single chip used in the fiber array of FIG. 16.

FIG. 17 shows a top view of a single chip (i.e., top array chip 66 or bottom array chip 68). Preferably, the chips 66 68 are single crystal silicon and trenches 70 are V-grooves formed by anisotropic wet etching (e.g. using KOH or EDP), as known in the art.

Figure 18:
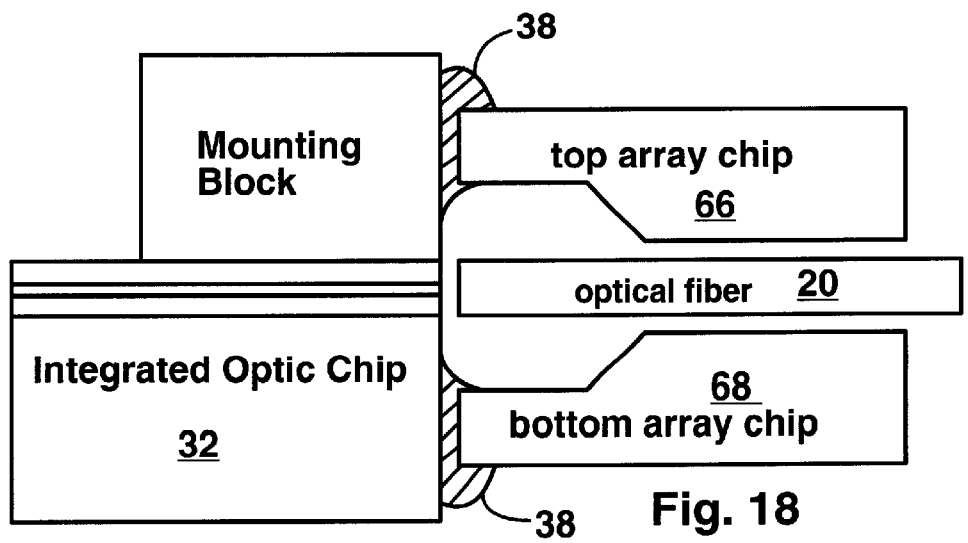
FIG. 18 shows the fiber array of FIG. 16 bonded to an IO chip.

FIG. 18 shows the fiber array of FIG. 16 bonded to an IO chip. The only surface area of the array that is not bonded to the IO chip is the front face of the optical fiber. The front face of both chips 66 68 is bonded to the IO chip 32.

Figure 19:
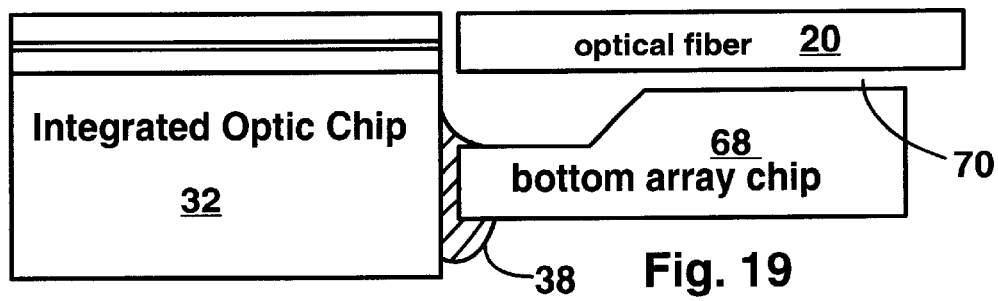
FIG. 19 shows an alternative embodiment where the fiber array has only a single fiber array chip with a widened trench.

FIG. 19 shows an alternative embodiment where the fiber array does not have the top array chip 66. The widened front portion of the trench functions as a wick stop groove.

In the embodiment of FIGS. 16, 17, 18 and 19, the optical fiber endface is preferably polished flush with the fiber array chip. This can be done by filling the front portion 72 of the trench 70 with a removable material such as wax, and polishing the front face. After the front face is polished, the wax material is removed with a solvent.

Figure 20:
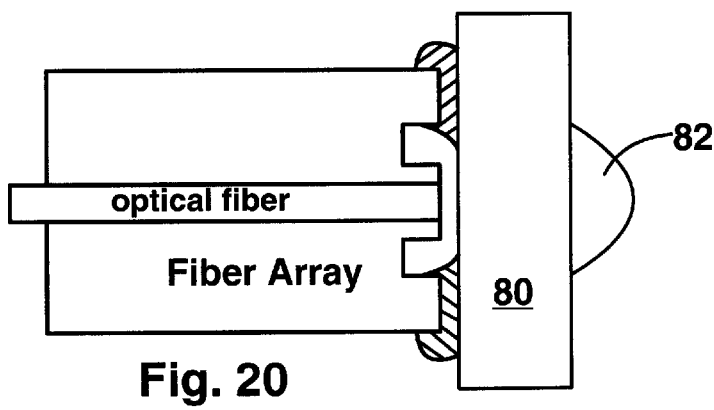
FIG. 20 shows the present fiber array bonded to a lenslet array.

The fiber arrays of the present invention can also be used to bond to lenslet arrays. FIG. 20 shows a side view of the present fiber array bonded to a chip 80 having lenses 82.

Figure 21:
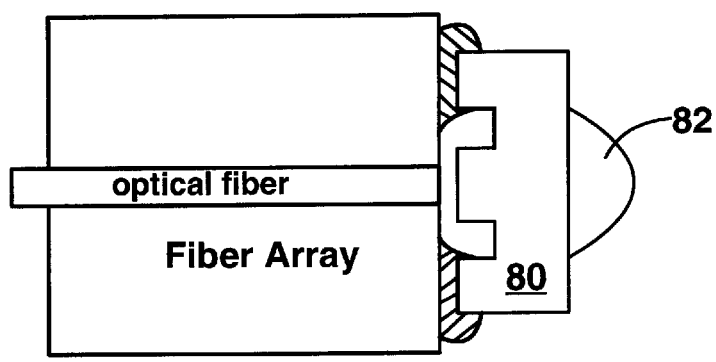
FIG. 21 shows a conventional fiber array bonded to a lenslet chip having front face wick stop grooves.

FIG. 21 shows an alternative embodiment having a lens chip 80 with wick stop trenches (e.g. cut with a dicing saw.

Wick stop grooves according to the present invention can be used in a wide variety of microoptical devices where it is undesirable to have adhesive disposed in a light path. Such devices include lens arrays, filters, fiber arrays, modulators, liquid crystal devics and the like.

Figure 22:
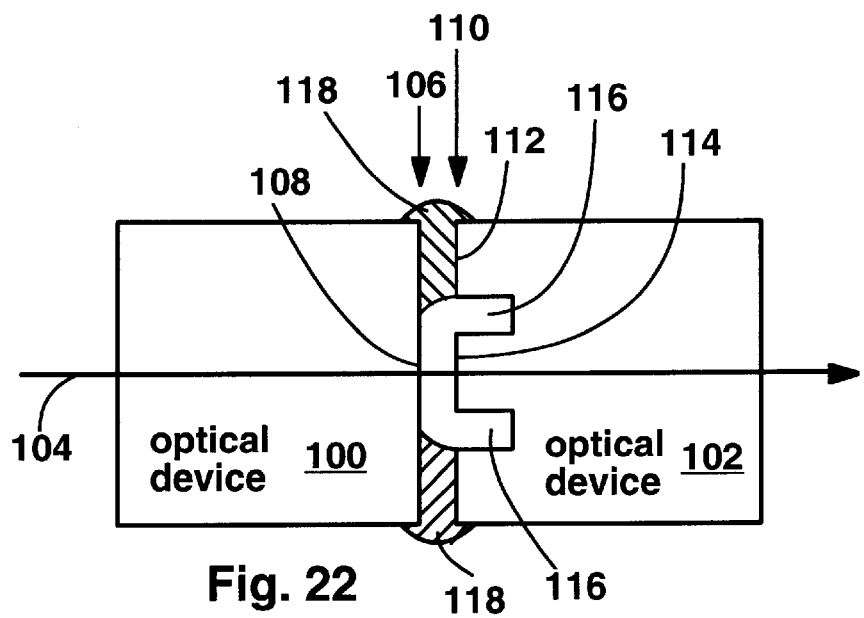
FIG. 22 shows a side view of a generalized description of the present invention. The present invention includes many different optical devices (e.g. other than fiber arrays and integrated optical devices) having wick stop grooves for controlled application of liquid adhesive.

FIG. 22 shows a side view of a generalized description of the present invention. A first optical device 100 is bonded to a second optical device 102. A straight optical path 104 extends through the first and second devices.

The first optical device has a face 106; an area of the face is an optical surface 108. The light path extends through the optical surface 108. Preferably, the optical surface is highly polished.

The second optical device 102 has a face 110 having a bonding area 112 and a nonbonding area 114. The bonding area 112 and the nonbonding area 114 are separated by a wick stop grooves 116. The light path extends through the nonbonding area 114.

A hardened liquid adhesive 118 is bonded to the bonding area 112 and the face 106 so that the first and second optical devices are bonded together. The adhesive is not disposed in the light path 104.

Preferably, the nonbonding area and the bonding area are coplanar as shown.

The adhesive 118 can be hardened epoxy, solder sol-gel materials or the like. The adhesive material should be formable by surface tension forces while in the liquid state so that the flkow of the adhesive material is controlled by the wick stop grooves 116.

The first and second optical devices can comprise many different optical devices including lens arrays, fiber arrays, filters, imaging devices and the like. The wick stop grooves 118 prevent adhesive from flowing into the light path 104. Since the adhesive is not disposed in the light path, a wider variety if adhesives can be used, including adhesives that have poor optical properties.

Although a gap is shown between the optical surface 108 and the nonbonding area 114, such a gap is optional and is shown mainly for clarity. If desired, the optical surface 108 and the nonbonding area 114 can be in direct contact. In fact, it may be desirable for the optical surface 108 and nonbonding area to be in direct contact. In a preferred embodiment of the invention the optical surface 108 and nonbonding area 114 are separated by less than 50 or 20 or 5 microns. Also, index-matching gel or liquid commonly known in the art can be disposed between the optical surface 108 and nonbonding area 114. An index matching material can improve optical coupling efficiency and reduce backreflection.

Figure 23:
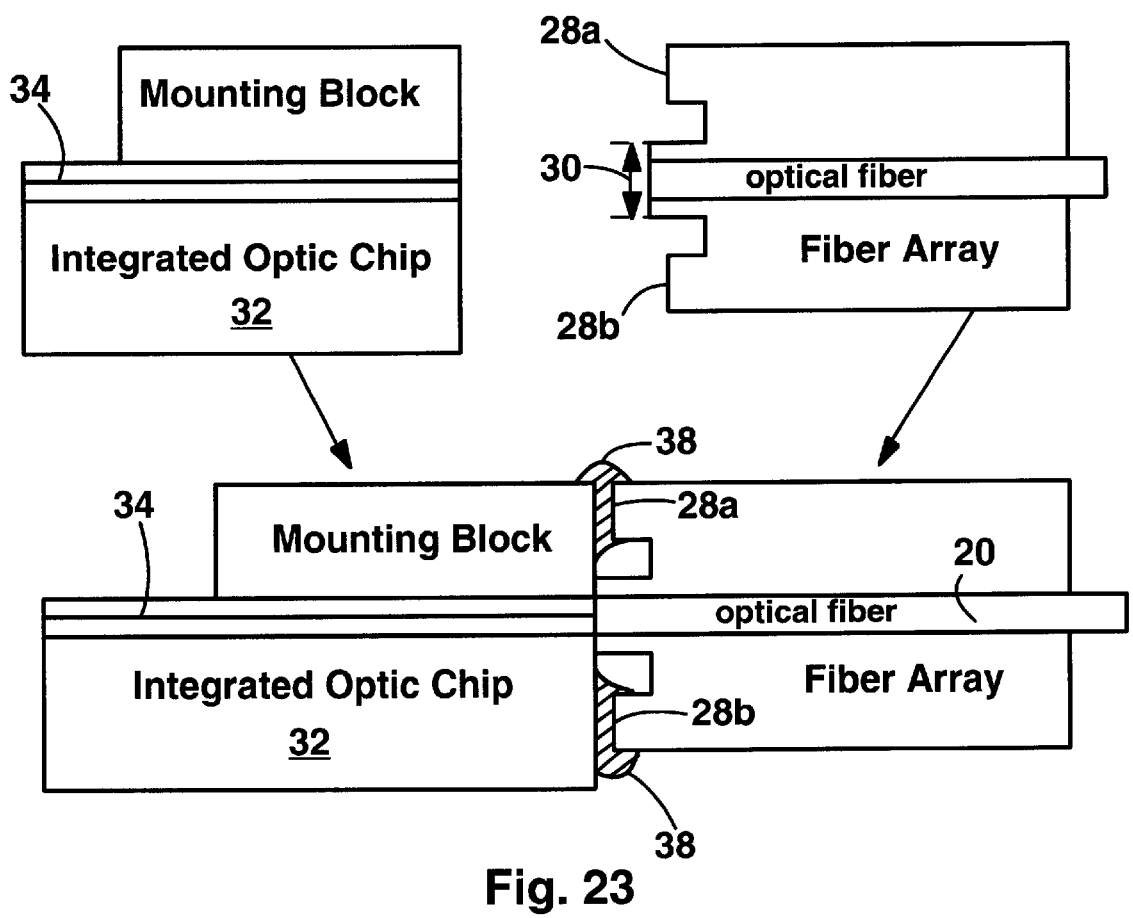
FIG. 23 shows an alternative embodiment where the bonding areas are recessed with respect to the nonbonding area. This allows the nonbonding area to contact the other optical device, while providing open volume for a substantial thickness of adhesive.

FIG. 23 shows a side view of an alternative embodiment where the bonding areas 28a 28b are recessed compared to the nonbonding area 30. This allows a thickness of adhesive 38 to exist between the fiber array and integrated optic chip 32 even when the optical fiber 20 and waveguide 34 are in direct contact. This is important because certain adhesives require a minimum thickness (e.g. 1–5 microns for certain epoxies) in order to adhere properly. Also, recessed bonding areas may be important for certain solder bonds. The bonding areas 28a 28b can be recessed about 2–20 microns compared to the nonbonding area, for example.

An advantage of having recessed bonding areas is that, because most adhesives shrink upon curing, the nonbonding areas will be pressed together as the adhesive cures. This will tend to improve mechanical contact in the nonbonding areas (i.e. reduce the possibility of an intervening gap), and result in better optical coupling.

Recessed bonding areas also provide accurate control of the adhesive thickness, and, hence, the amount of adhesive required. This is an advantage in certain applications where precise application of adhesive is important. Too much adhesive can cause dripping and adhesive flow into the optical path; too little adhesive can produce a poor bond.

Figure 24:
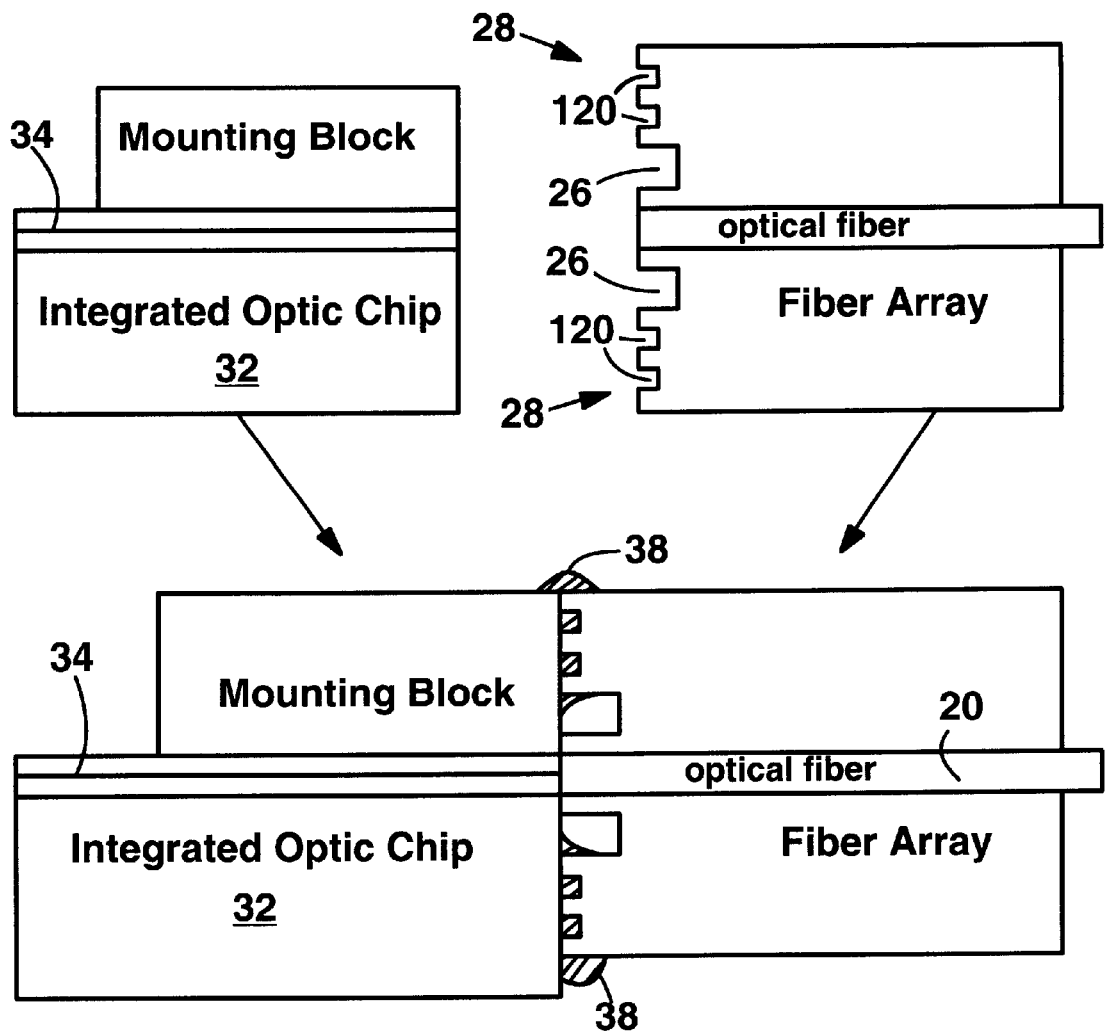
FIG. 24 shows an alternative embodiment where the bonding area has microgrooves 120 for improved bonding.

FIG. 24 shows yet another embodiment of the present invention where the bonding areas 28 have microgrooves 120. The microgrooves are much smaller (e.g. preferably ⅕ –1/20 the size) than the wick stop grooves 26. The microgrooves 120 are small enough so that they do not impede the flow of adhesive; adhesive flows into the microgrooves by capillary action. The microgrooves improve the mechanical bond by providing increased surface area for the adhesive. Another advantage of the microgrooves is that they can provide for improved contact (i.e. reduced possibility of an intervening gap) between the nonbonding areas because most adhesives contract slightly when cured. The adhesive will tend to press together the nonbonding areas as the adhesive shrinks.

The microgrooves 120 can be about 1–20 microns wide and about 1–20 microns deep, for example.

Of course, the components in the present invention can have faces that are oriented nonperpendicularly with respect to the waveguide, optical fiber, and/or light path in order to reduce backreflection. For example, the faces can be angled at about 8 degrees, as is known in the art. Integrated optic chips often have angled edges to reduce back reflection. For clarity, angled faces have not been illustrated in the present specification.

It will be clear to one skilled in the art that the above embodiment may be altered in many ways without departing from the scope of the invention. Accordingly, the scope of the invention should be determined by the following claims and their legal equivalents.

What is claimed is:

1. An optical fiber array comprising:
   a) a fiber array chip for holding an optical fiber, wherein the chip has a front face comprising a bonding area and a nonbonding area;
   c) a wick stop groove disposed in the front face, wherein the wick stop groove separates the bonding area and the nonbonding area;
   b) an optical fiber attached to the chip, wherein the optical fiber has an endface coplanar with the front face of the chip, and wherein the optical fiber endface is disposed in the nonbonding area.

2. The optical device of claim 1 further comprising an integrated optic chip having an edge and a waveguide with a termination at the edge, wherein:
   1) the bonding area is bonded to the IO chip edge with adhesive, and
   2) the adhesive is not present between the IO chip edge and the nonbonding area so that adhesive is not present between the waveguide and optical fiber.

3. The optical fiber array of claim 1 wherein the chip is made of silicon and the chip has V-grooves for holding the optical fiber.

4. The optical fiber array of claim 1 wherein the wick stop groove is a dicing saw cut groove.

5. The optical fiber array of claim 1 wherein the wick stop groove has a depth in the range of 50–500 microns.

6. The optical fiber array of claim 1 wherein the wick stop groove has a width in the range of 25–500 microns.

7. The optical fiber array of claim 1 further comprising a stepped block having a step (64) which forms the wick stop groove.

8. The optical fiber array of claim 1 further comprising intersecting vertical and horizontal wick stop grooves.

9. The optical fiber array of claim 1 wherein the bonding area is surrounded by wick stop grooves.

10. The optical fiber array of claim 1 wherein the fiber array chip has a trench for holding the optical fiber, and the trench has a widened front portion (72) so that the trench provides a wick stop groove.

11. The optical fiber array of claim 1 wherein the bonding area is recessed compared to the nonbonding area.

12. The optical fiber array of claim 1 wherein the bonding area has a microgroove.

13. An integrated optic chip comprising:
  a) a substrate having an edge comprising a bonding area and a nonbonding area;
  b) waveguide on the substrate, wherein the waveguide has a terminal end in the nonbonding area; and
  c) a wick stop groove disposed in the edge wherein the wick stop groove separates the bonding area and the nonbonding area.

14. The integrated optic chip of claim 13 further comprising a fiber array having a front face and an optical fiber with an endface coplanar with the front face, wherein:
  1) the bonding area is bonded to the fiber array front face with adhesive, and
  2) the adhesive is not present between the fiber array edge and the nonbonding area so that adhesive is not present between the waveguide and optical fiber.

15. The integrated optic chip of claim 13 wherein the chip is made of silicon and the chip has V-grooves for holding the optical fiber.

16. The integrated optic chip of claim 13 wherein the wick stop groove is a dicing saw cut groove.

17. The integrated optic chip of claim 13 wherein the wick stop groove has a depth in the range of 50–500 microns.

18. The integrated optic chip of claim 13 wherein the wick stop groove has a width in the range of 25–500 microns.

19. The integrated optic chip of claim 13 further comprising a stepped block having a step (64) which forms the wick stop groove.

20. The integrated optic chip of claim 13 further comprising intersecting vertical and horizontal wick stop grooves.

21. The integrated optic chip of claim 13 wherein the bonding area is surrounded by wick stop grooves.

22. The integrated optic chip of claim 13 wherein the bonding area is recessed compared to the nonbonding area.

23. The integrated optic chip of claim 13 wherein the bonding area has a microgroove.

24. An optical apparatus comprising:
  a) a first optical device having a face with an optical surface;
  b) a second optical device having a bonding area and a nonbonding area, wherein the bonding area and nonbonding area are separated by a wick stop groove;
  wherein a light path extends through the optical surface and the nonbonding area;
  wherein the optical surface and nonbonding area are facing each other;
  c) a hardened liquid adhesive bonded to the face and the bonding area, wherein the hardened liquid adhesive is not disposed in the light path.

25. The optical apparatus of claim 24 wherein the nonbonding area and the bonding area are coplanar.

26. The optical apparatus of claim 24 wherein the first optical device and the second optical device are selected from the group of optical devices consisting of fiber arrays, lens arrays, and integrated optical waveguides.

27. The optical apparatus of claim 24 wherein the wick stop groove is a dicing saw cut groove.

28. The optical apparatus of claim 24 wherein the wick stop groove has a depth in the range of 50–500 microns.

29. The optical apparatus of claim 24 wherein the wick stop groove has a width in the range of 25–500 microns.

30. The optical apparatus of claim 24 further comprising intersecting vertical and horizontal wick stop grooves.

31. The optical apparatus of claim 24 wherein the bonding area is surrounded by wick stop grooves.

32. The optical apparatus of claim 24 wherein the first optical device further comprises a wick stop groove disposed in the face so that:
  a) the face is divided into a first nonbonding area and a first bonding area;
  b) the optical path intersects the nonbonding area;
  c) the adhesive is bonded to the first bonding area.

33. The optical apparatus of claim 24 wherein the bonding area is recessed compared to the nonbonding area.

34. The optical apparatus of claim 24 wherein the bonding area has a microgroove mostly filled with the hardened liquid adhesive.

\* \* \* \* \*